Aug. 14, 1945.  C. C. FUERST  2,382,624
CAMERA SHUTTER
Filed Feb. 25, 1944   2 Sheets-Sheet 1

CARL C. FUERST
INVENTOR
BY
ATTORNEYS

CARL C. FUERST
INVENTOR

Patented Aug. 14, 1945

2,382,624

UNITED STATES PATENT OFFICE 2,382,624

CAMERA SHUTTER

Carl C. Fuerst, Rochester, N. Y., assignor to Eastman Kodak Company, Rochester, N. Y., a corporation of New Jersey Application February 25, 1944, Serial No. 523,803

10 Claims. (Cl. 95—63)

This invention relates to a shutter for photographic cameras and particularly to a shutter of the type in which a master member is set or tensioned before an exposure can be made. One object of my invention is to provide a shutter operating structure which is capable of obtaining high-speed exposures. Another object of my invention is to provide a shutter mechanism in which accurately timed slow exposures can also be obtained. A still further object of my invention is to provide a shutter blade driving structure in which the relation of the shutter blade driver can be altered with respect to the blade driving mechanism. A still further object of my invention is to provide a mechanism including a simple form of factory adjustment which can be used to facilitate assembling the shutter drive mechanism and other objects will appear from the following specification, the novel features being particularly pointed out in the claims at the end thereof.

In order to obtain relatively high-speed exposures with shutters of the between-the-lens type, it has been necessary to drive the shutter blades with a high degree of rapidity causing the shutter blades to open and close as fast as possible. This can be most readily accomplished with shutter blades which are of the so-called double-ended type; that is, a shutter blade having opposite ends either one of which may cover an exposure aperture in a shutter. Such shutter leaves can be moved faster than shutter leaves which must open, reverse their direction of movement, and then close.

It is also necessary to provide delayed action automatically timed exposures, such exposures usually ranging from one second to 1/100 or to 1/200 of a second where the fastest exposures may be 1/500 to 1/800 of a second. In the slower-speed automatic exposures it is desirable to have the shutter blades open, then to have the blades slow up or completely stop, then to have the blades close. With the double-ended type of blade the blade always moves in only one direction for opening and closing the exposure aperture. The delay or stoppage of the shutter blade in its open position is used to obtain the necessary delay for the automatically timed exposure; as for instance, 1/5 or 1/2 of a second. It is customary to provide some retarding mechanism which comes into action during the period of time that the blades are open.

It is therefore desirable to provide a shutter-driving mechanism in which the drive causes an extremely rapid and continuous blade movement for the fastest exposures and to provide a shutter blade drive in which there may be a dwell during that time that the exposure blades have uncovered the exposure opening.

My present invention is particularly directed to the provision of a suitable drive with which both extremely high-speed exposures and exposures of the slower automatic variety may readily be obtained.

Coming now to the drawings wherein reference characters denote like parts throughout:

Figure 1:
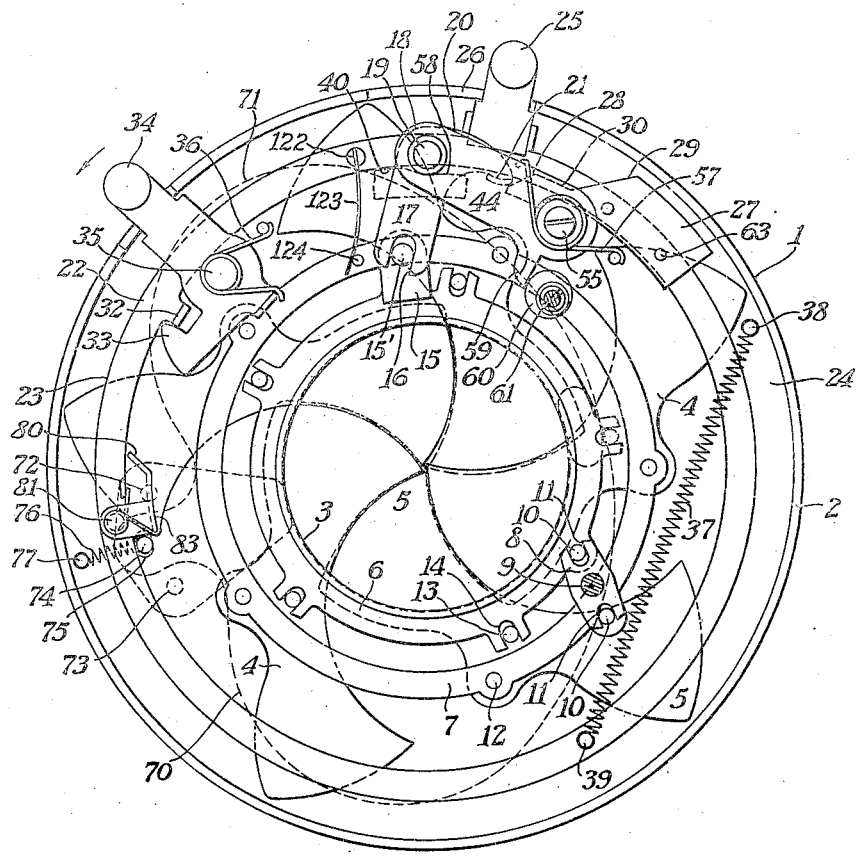
Figure 1 is a front elevation of a shutter mechanism including a drive constructed in accordance with and embodying a preferred form of my invention. In this figure, the parts are shown in position to make an exposure, the shutter being set.

My invention consists broadly in a shutter mechanism in which a plurality of double-ended shutter blades carried by two movably mounted blade rings may be rapidly moved in a single direction for high-speed exposures and may be moved, stopped, and then moved again for producing delayed action automatic exposures by a driving mechanism. This driving mechanism may consist of a movable cam adapted to strike and move a lever connected to the blade rings, there being a manual adjustment by which the relationship of the blade ring driving lever and the master member may be automatically altered as the shutter is set for a high-speed exposure.

More specifically, my invention may be embodied in the shutter shown in the accompanying drawings. The shutter may include a generally circular casing 1, preferably provided with an upstanding flange 2 around its periphery, and an exposure aperture 3 in the center thereof. The exposure aperture may be covered by a plurality of shutter leaves 4, each leaf 4 having broadened-out ends 5 adapted to cover the exposure aperture 3 and to exclude light therefrom.

Each of the shutter leaves 4 is attached to each of two blade rings 6 and 7, these blade rings being connected by means of a rocker arm 8 which may turn about a pivot 9. The rocker arm 8 has a pin 10 and slot 11 connection with each of the blade rings so that when the blade ring 6 moves in a clockwise direction, the blade ring 7 may move in a counterclockwise direction.

Each shutter leaf 4 is carried by the two blade rings 6 and 7 and the blades 4 may be pivotally attached, as indicated at 12, to one blade ring and may have a pin 13 and slot 14 connection with the opposite blade ring. This structure causes the blades to move rapidly when the pins 12 and 13 are moved in opposite directions by the blade rings 6 and 7.

In order to move the blade rings, one of the blade rings here shown as 7 is provided with an offset arm 15 carrying a pin 15' which engages a slot 16 in one end 17 of a bell crank lever 18 which may be pivoted upon a stud 19. The opposite arm 20 of the bell crank lever is provided with a curved surface 21 constituting a cam follower. When the lever 18 is moved, the blade ring 6 will be moved, and when the blade ring 6 is moved the blade ring 7 will be moved in a substantially equal and opposite direction.

Figure 5:
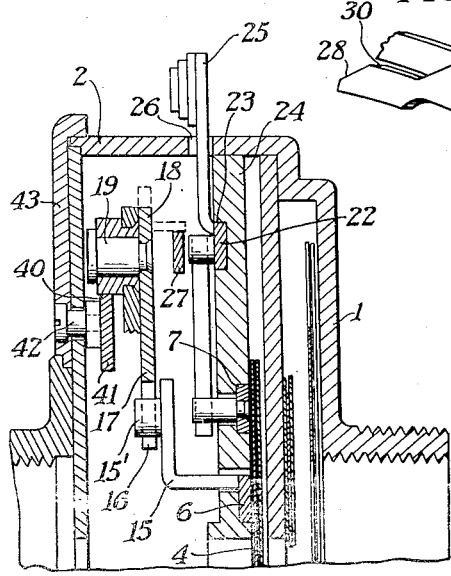
Figure 5 is a fragmentary detail sectional view taken on line 5—5 of Figure 3.
Figures 4, 6:
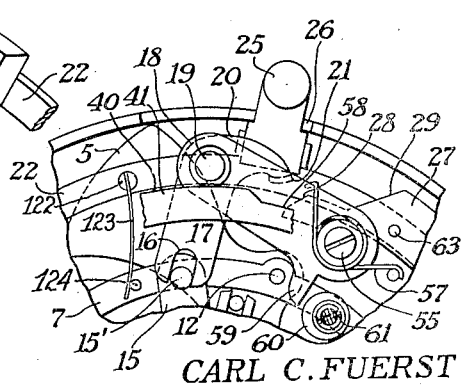
Figure 4 is a fragmentary plan view of a portion of the shutter mechanism with the driving lever set to a high speed driving position.
Figure 6 is a fragmentary detail perspective view of a portion of the master member.

In order to move the lever 18, I provide a master member which in this instance consists of a ring 22 mounted to turn in a groove 23 formed in a mechanism plate 24 as best shown in Figure 5. The ring 22 may be provided with a setting lever 25 which, as best shown in Figure 5, may extend out through a slot 26 in the upstanding flange 2. Referring to Figure 6, the master member 22 is provided with a cam 27 which includes a pair of spaced inclined surfaces 28 and 29 connected by a surface 30 which may be concentric with the shutter.

With the parts in the position shown in Figure 1, the cam follower 21 lies in front of the inclined surface 28 so that when the ring 22 moves, the cam follower is raised and the lever 18 is turned about the stud 19. The parts are so positioned that the inclined surface 28 of the cam is sufficient to cause the blades to move to an open position and they will pause in this position as the master member moves the concentric portion 30 of the cam beneath the cam follower 21. After pausing normally, the inclined surface 29 moves the lever 18 still further and causes this lever to close the shutter blades. It should be noticed that the inclined surfaces 28 and 29 are in the same direction so that when the master member moves from its Figure 1 position to its Figure 3 position, the lever 18 is always moved in the same direction; that is, in a counterclockwise direction with respect to these figures about the stud 19.

The master member 22 may be held in its set or latched position of Figure 1 in the following manner:

The ring 22 is provided with an upstanding lug 32 which may be engaged by a latch element 33 carried by a trigger 34 pivoted on the stud 35 and pressed by a spring 36 into engagement with the lug 32. Thus, the lug 32 and the hook 33 form latch elements which will retain the master member 22 in its set position with the driving spring 37 under tension. This driving spring may be attached to the mechanism plate 24 by a pin 38 and may be attached to the ring 22 by means of a pin 39. The spring 37 always tends to turn the master member 22 in a counterclockwise direction. With the parts in the Figure 1 position an exposure may be made by depressing the trigger 34, turning it in a counterclockwise direction releasing the latch elements 32 and 33. The spring 37 will rapidly move the master member and cause the shutter blades to open and close as the cam 27 engages the cam follower 21.

The master member 22 carries a pin 122 which supports a leaf spring 123 having its free end engaging a pin 124 carried by the blade ring 7. Blade rings 6 and 7 are connected by the rocker arm 8 to move in opposite directions and, since blade ring 6 carries a pin 15' engaging one end 17 of a bell crank lever 18, the pressure of spring 123 on pin 124 tends to rock the bell crank lever 18 so that the end thereof 21 may engage the cam 27—that is either the cam surface 28 or the cam surface 29.

Figure 3:
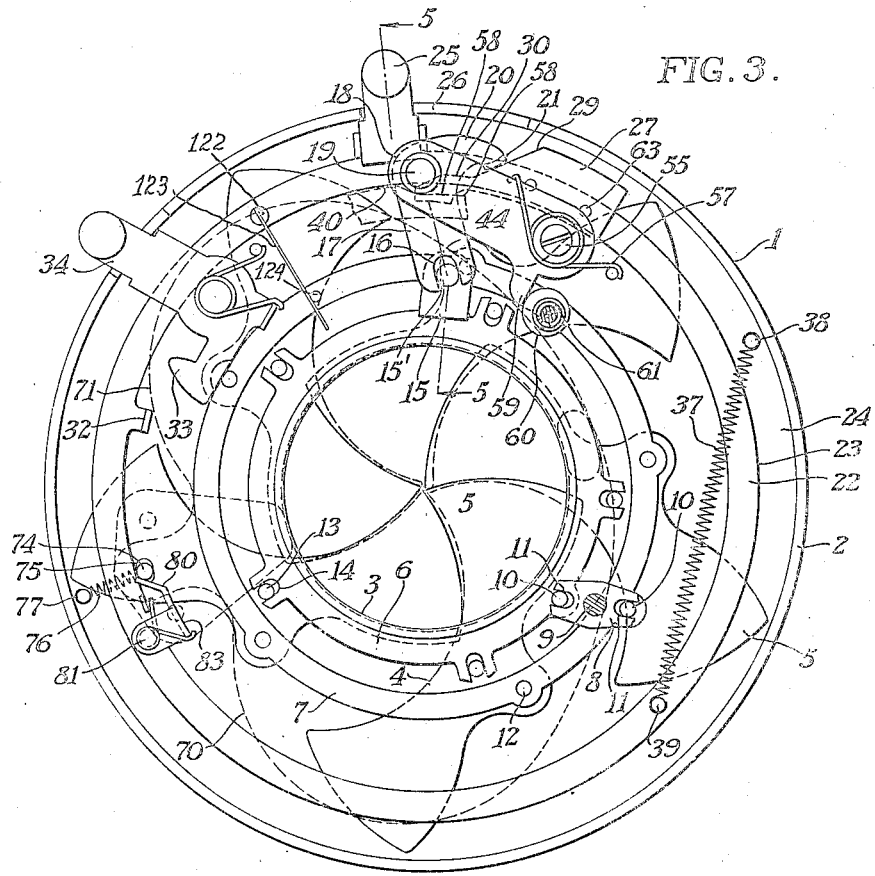
Figure 3 is a view similar to Figure 1 but with the parts of the shutter in the position they assume after an exposure has been made.

Since the extent of movement of the master member 22 is considerably greater than the extent of movement of the blade ring 7 and since they move in the same direction in making an exposure the pressure exerted by spring 123 on spring 124 becomes progressively less when the parts move from the Fig. 1 position to the Fig. 3 position. Consequently the spring 23 does not tend to react against the master member spring 37.

The above described exposure is used for the slow or automatic exposures since the blades pause in their open position as the cam follower 21 lies on portion 30 of the cam. At this point, any suitable gear delaying mechanism may be connected to the shutter driving mechanism.

Where the highest speed is required, the relation between the cam follower 21 and the driving cam 27 is altered in such a manner that the cam follower does not engage the first inclined surface 28 at all, but is only engaged by the inclined surface 29. This movement is accomplished by shifting the position of the stud 19 carrying the lever 18. This stud, as indicated in Figures 4 and 5, is positioned to engage a cam surface 40 carried by a plate 41 which is connected as by a screw 42 to a speed adjusting ring 43 on the outside of the shutter casing 1. When in the position shown in Figure 4, movement of the stud 19 is permitted because this stud is supported on the end of a link 44 pivotally attached at 55 to the mechanism plate 24. A spring 57 tends to turn the link 44 in a counterclockwise direction which movement is opposed by the cam 40. When the parts are in the position shown in Figure 4, it will be obvious that when the trigger is released, the master member will turn rapidly until the inclined surface 29 strikes the cam follower 21 causing it to move. This time the cam follower lies above and therefore fails to contact with either the first inclined surface 28 or the concentric surface 30 of the cam 27. Consequently, when the inclined surface 29 strikes the cam follower 21, it moves it rapidly through its full extent of movement causing the lever 18 to open and close the blades in one continuous rapid movement.

When the slower speed exposures are required, the cam 40 may be moved in a counterclockwise direction with respect to Figure 4 so that the stud 19 may move toward the center of the shutter because of the cut-out portion 58 of the cam 40. The movement of the link 44 will then be limited by the lug 59 striking the cam stop 60.

The cam stop 60 is a simple form of factory adjustment to insure the proper relationship between the stud 19 and the cam 27. When the shutter is being assembled, an operator may turn the cam 60 through the slot 61 so that the cam follower 21 will strike the inclined surface 28, will ride over the concentric surface 30, and will strike the inclined surface 29 when the parts are adjusted to their Figure 3 position, and so that the cam follower 21 may miss the inclined surface 28 and the concentric surface 30 when the shutter is adjusted for high speeds as shown in Figure 4. In the present embodiment of my invention as shown in Figure 6, the cam 27 may be attached to the master member 22 by rivets 63 or by any other suitable means which will hold the cam rigidly in position.

In shutters of the type using double-ended blades as above described, it is necessary to cover the exposure aperture 3 during the time the shutter blades are opened and closed for setting the shutter. This may be done in the manner shown in Figures 1 and 2 with supplementary shutter blades if desired. This structure is the subject matter of my copending application, Serial No. 489,484, for Camera shutter, filed June 3, 1943. If it is desired to combine the diaphragm and the supplemental shutter leaves, the structure used in my copending application, Serial No. 489,485 for Diaphragm shutter, filed June 3, 1943, may be employed.

Figure 2:
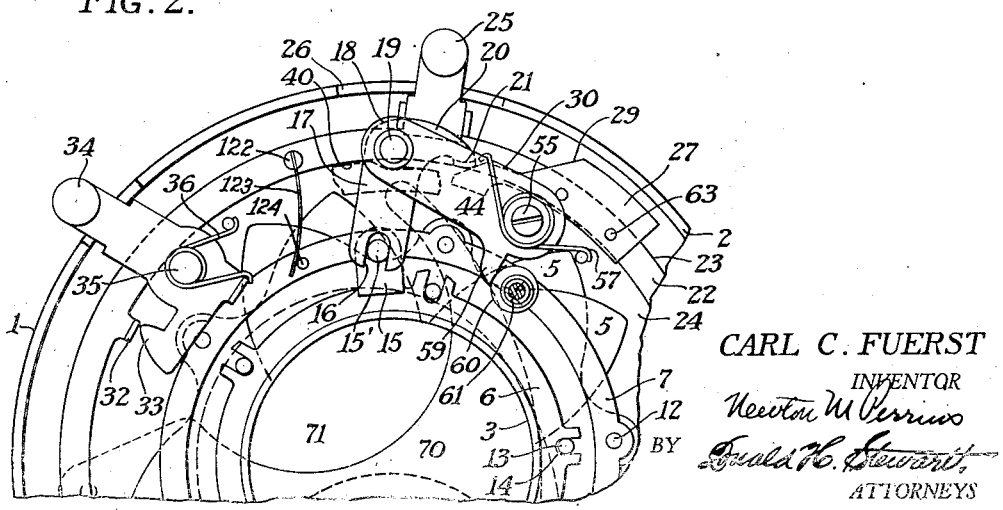
Figure 2 is a fragmentary view of the shutter shown in Figure 1 but with the parts in the position they assume as the shutter is being set.

In the first-described supplementary shutter leaf structure there may be two or more leaves movable to close the exposure aperture 3 before the shutter leaves 4 open and close during the setting operation. As indicated in Figure 2, the supplemental shutter leaves 70 and 71 may be pivotally attached to studs 72 and 73 as shown in Figure 1. There may be a pin 74 and slot 75 connection between these leaves so that by rocking the pin 74 to and from the center of the shutter, the supplementary blades 70 and 71 may open and close. A spring 76 attached to a pin 77 normally hold these blades in their open position. However, with the shutter parts in the rest position of Figure 3 and with the blades 70 and 71 open, movement of the setting lever 25 to tension the master member spring 37 causes the hinged latch member 80, carried on the pin 81 by the master member 22, to engage the pin 74 moving this pin toward the center of the shutter during the first part of the movement of the setting lever 25. This quickly moves the leaves 70 and 71 to the closed position of Figure 2 so that the shutter leaves 4 may open and close during the setting operation. This opening and closing takes place behind the closed leaves 70 and 71 and consequently, light cannot enter the exposure aperture 3. After the pin 74 rides up on the cam end of the latch 80, it may ride around the concentric portion 83 of this latch until it slips off the end of the latch. This occurs when the setting of lever 25 is complete.

When an exposure is made by depressing the trigger 34, the master member again moves rapidly and the pin 74 rides on the inside of the latch 8 causing it to slip around the pin and into its Figure 3 position at the completion of the exposure. The parts are now in a position for setting the shutter again.

With the construction above described, the lever which operates the blade rings can be readily moved between a high-speed position and a position for slow automatically timed exposures. This is accomplished automatically by merely turning the speed dial 43 which automatically moves the cam 40 to either the Figure 4 position for high-speed exposures or to the Figure 1 position for the more normal and slow-speed exposures. The length of the slot 16 in which the pin 15' may slide is sufficiently long to permit this movement of the lever 18 without disengaging the pin 15' from the slot 16. The master member driving cam 27 is a one-piece rigid member, the position of which cannot be altered with respect to the master member. Consequently, there are very few movable parts in this driving connection to get out of order, and the construction is quite simple. Since at high speeds, the shutter blades are driven in only one direction by a single inclined surface 29 on the cam 27, the action is definite and the exposures can be readily duplicated.

While it is obvious that my invention is not confined to the particular form of parts shown and described because various modifications will readily suggest themselves to those skilled in the art, I have nevertheless described a preferred form of an adjustable shutter driving mechanism. I consider as within the scope of my invention all such forms as may come within the scope of the appended claims.

I claim:

1. In a shutter for photographic cameras of the type including a casing, a master member movably mounted in the casing, a trigger, elements for holding the master member in a set position, one of said elements being operable with the trigger to release the master member for an exposure, double ended shutter blades, and at least one blade ring for moving the shutter blades, the combination with said master member, release means and trigger, of a cam carried by said master member for operating the shutter blades, a bell crank lever, a movable mount therefor, to position one end of the bell crank lever relative to the cam whereby the point of impact by the cam driven by the master member against the bell crank lever may be varied, and connections between the bell crank lever and said blade ring for transmitting movement from the bell crank lever thereto.

2. A photographic shutter comprising a plurality of shutter blades having two ends adapted to swing in one direction only to first open then close an exposure aperture; movable operating means for the shutter blades, a swingable cam, a master member carrying said cam, and a swingable bell crank lever having one end lying in the path of the swingable cam, and the other arm operably connected to the movable operating means for the shutter blades, whereby said cam may engage and drive the bell crank lever to first open and then close the exposure aperture moving the blades in one direction only, and an adjustable member for altering the pivotal support of the bell crank lever and the point of contact of the bell crank lever and its driving cam.

3. In a shutter for photographic cameras of the type including a casing, a master member movably mounted in the casing, a trigger, elements for holding the master member in a set position, one of said elements being operable with the trigger to release the master member for an exposure, double ended shutter blades, and at least one blade ring for moving the shutter blades, the combination with said master member, release means and trigger, of a cam carried by said master member for operating the shutter blades, said cam comprising two inclined surfaces both slanting in the same direction and spaced by an arcuate surface, a bell crank lever having two arms, one for driving said blade ring and the other for engaging the cam, and means for moving the bell crank lever pivot to vary the contact position of the cam engaging arm of the bell crank lever and the said cam.

4. In a shutter for photographic cameras of the type including a casing, a master member movably mounted in the casing, a trigger, elements for holding the master member in a set position, one of said elements being operable with the trigger to release the master member for an exposure, double ended shutter blades, and at least one blade ring for moving the shutter blades, the combination with said master member, release means and trigger, of a cam carried by said master member for operating the shutter blades, said cam comprising two inclined surfaces both slanting in the same direction and spaced by an arcuate surface, a bell crank lever having two arms, one for driving said blade ring and the other for engaging the cam, and means for moving the bell crank lever pivot to vary the contact position of the cam engaging arm of the bell crank lever and the said cam, the arm of the bell crank lever for driving said blade ring including a pin and slot connection with the blade ring of at least as great extent as the possible movement of the means for moving bell crank lever, whereby said bell crank lever arm and said blade ring may always remain in operative engagement.

5. In a shutter for photographic cameras of the type including a casing, a master member movably mounted in the casing, a trigger, elements for holding the master member in a set position, one of said elements being operable with the trigger to release the master member for an exposure, double ended shutter blades, and at least one blade ring for moving the shutter blades, the combination wtih said master member, release means and trigger, of a cam carried by said master member for operating the shutter blades, a bell crank lever, an arm on the bell crank lever to be engaged by the cam, said cam including cam surfaces for successively engaging and driving the bell crank lever in the same direction to open and close the shutter leaves, and means between the bell crank lever and said blade ring for driving the latter by the former.

6. In a shutter for photographic cameras of the type including a casing, a master member movably mounted in the casing, a trigger, elements for holding the master member in a set position, one of said elements being operable with the trigger to release the master member for an exposure, double ended shutter blades, and at least one blade ring for moving the shutter blades, the combination with said master member, release means and trigger, of a cam carried by said master member for operating the shutter blades, a bell crank lever, an arm on the bell crank lever to be engaged by the cam, said cam including cam surfaces for successively engaging and driving the bell crank lever in the same direction to open and close the shutter leaves, and means between the bell crank lever and said blade ring for driving the latter by the former, and a supplemental member carried by the master member for holding the bell crank lever against said cam.

7. In a shutter for photographic cameras of the type including a casing, a master member movably mounted in the casing, a trigger, co-operating elements for holding the master member in a set position, one of said elements being operable with the trigger to release the master member for an exposure, double ended shutter blades, two blade rings movably carrying the shutter blades, the combination with said master member and a blade ring, a cam and cam follower for moving the latter by the former, of a spring carried by the master member and engaging a blade ring for holding the cam and cam follower in contact, said blade ring and master member both being mounted to move in the same direction in making an exposure, and mechanism for driving the blade ring by the master member.

8. In a shutter for photographic cameras of the type including a casing, an aperture therein through which exposures are made, the combination with said casing, of a plurality of shutter leaves adapted to cover and uncover said exposure opening, three movably mounted concentric rings extending about said aperture, two of said rings carrying said shutter blades and constituting blade rings, the third ring being spring driven in one direction and constituting a master member, a cam fixedly mounted on the master member and including two similarly disposed inclined surfaces extending in the same general direction and connected by a substantially circumferential surface, connecting means between the blade rings to move one ring in one direction and the other in an opposite direction, a pivotally mounted cam engaging lever operatively engaging a blade ring for moving the blade rings from the master member, and means for shifting the pivotal mount of the blade ring driving lever.

9. In a shutter for photographic cameras of the type including a casing, an aperture therein through which exposures are made, the combination with said casing, of a plurality of shutter leaves adapted to cover and uncover said exposure opening, three movably mounted concentric rings extending about said aperture, two of said rings carrying said shutter blades and constituting blade rings, the third ring being spring driven in one direction and constituting a master member, a cam fixedly mounted on the master member and including two similarly disposed inclined surfaces extending in the same general direction and connected by a substantially circumferential surface, connecting means between the blade rings to move one ring in one direction and the other in an opposite direction, a pivotally mounted cam engaging lever operatively engaging a blade ring for moving the blade rings from the master member, and means for shifting the pivotal mount of the blade ring driving lever comprising a pivoted link carrying the pivotal mount of said lever, said means for shifting the pivotal mount of the blade ring driving lever including a manually settable member carried by the shutter.

10. In a shutter for photographic cameras of the type including a casing, an aperture therein through which exposures are made, the combination with said casing, of a plurality of shutter leaves adapted to cover and uncover said exposure opening, three movably mounted concentric rings extending about said aperture, two of said rings carrying said shutter blades and constituting blade rings, the third ring being spring driven in one direction and constituting a master member, a cam fixedly mounted on the master member and including two similarly disposed inclined surfaces extending in the same general direction and connected by a substantially circumferential surface, connecting means between the blade rings to move one ring in one direction and the other in an opposite direction, a pivotally mounted bell crank lever having a cam follower on one end and a pin and slot connection with a blade ring on the other end, a link carrying the bell crank lever pivoted between the master member and blade rings, means for swinging the said link to vary the point of engagement between said cam on the master member and the cam follower, the length of said pin and slot connection between the bell crank lever and blade ring being of an extent greater than the possible movement of said link.

CARL C. FUERST.